UNITED STATES PATENT OFFICE.

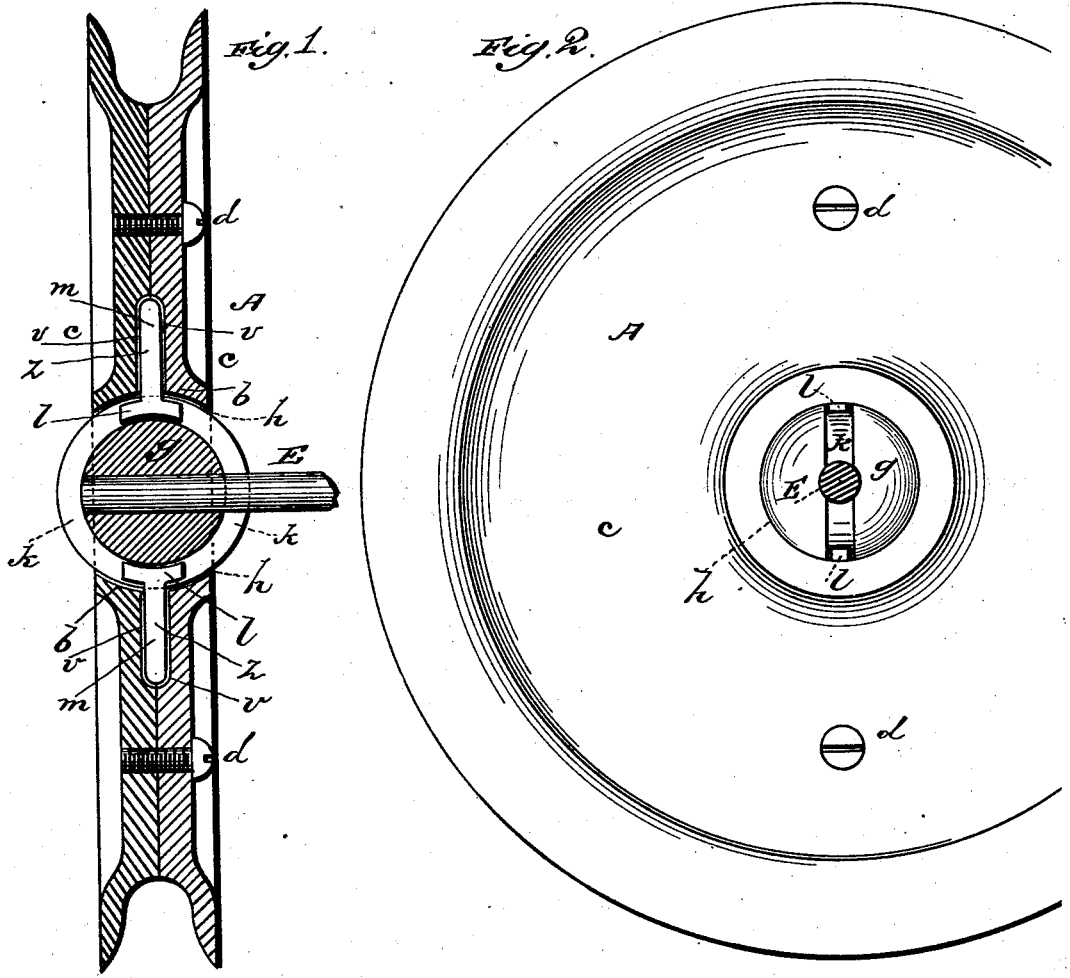

ROBERT EDMONDS, OF NORFOLK, VIRGINIA.

UNIVERSAL JOINT.

SPECIFICATION forming part of Letters Patent No. 281,850, dated July 24, 1883.

Application filed April 3, 1883. (No model.)

*To all whom it may concern:*

Be it known that I, ROBERT EDMONDS, a citizen of Great Britain, but for thirty years a resident of the United States, residing at Norfolk, in the county of Norfolk and State of Virginia, for the last two years, have invented certain new and useful Improvements in Universal Joints; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view of my joint, and Fig. 2 is a face view of the same.

This invention has relation to universal joints for machinery; and it consists in the construction and novel arrangement of the sectional concave bearing, the circumferentially-grooved ball engaging said bearing, and the pivoted clutch devices extending from the concave bearing to engage the groove of the ball, all as hereinafter set forth.

In the accompanying drawings, the letter A designates a pulley or wheel, having at its center a concave bearing, $b$, the halves or sections $c$ of which are separable, and are secured together by means of screws $d$.

E represents a shaft, which is keyed or otherwise rigidly attached to a ball, $g$, which is seated neatly in the concave bearing $b$, and is movable therein, so that the shaft E may take any angular position with reference to the wheel or pulley A within the limits of the openings $h$ of the concave bearing.

Around the ball $g$, and in an axial plane of the shaft connected thereto, is a circumferential groove, $k$, into which extend the expanded ends $l$ of the pivoted clutch bearings or pins $m$, the stems $z$ of which are seated in recesses $v$ of the sections forming the ball-bearing. These clutch bearings or pins turn freely with the ball, whatever be the angular position of the shaft with reference to the plane of the pulley or wheel.

Having described this invention, what I claim, and desire to secure by Letters Patent, is—

1. In a universal joint, the combination, with a sectional concave bearing and a circumferentially-grooved ball engaging said bearing, of pivoted clutch devices extending into the concave bearing to engage the groove of the ball, substantially as specified.

2. In a universal joint, the combination, with a wheel or pulley having a sectional concave bearing and pivoted clutch-pins extending inwardly therefrom, of the shaft and its ball seated in said concave bearing, and having a circumferential groove in an axial plane of said shaft engaging the clutch-pins, substantially as specified.

In testimony whereof I affix my signature in presence of two witnesses.

ROBERT EDMONDS.

Witnesses:
T. R. BORLAND,
D. TUCKER BROOKE.